United States Patent
Narayanan

(10) Patent No.: US 10,682,721 B2
(45) Date of Patent: Jun. 16, 2020

(54) METHOD AND SYSTEM FOR WELDING WITH TEMPERATURE DETECTOR

(71) Applicant: LINCOLN GLOBAL, INC., City of Industry, CA (US)

(72) Inventor: Badri Narayanan, Mayfield Heights, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 533 days.

(21) Appl. No.: 15/210,089

(22) Filed: Jul. 14, 2016

(65) Prior Publication Data

US 2018/0015559 A1  Jan. 18, 2018

(51) Int. Cl.
*B23K 9/09* (2006.01)
*B23K 9/095* (2006.01)
(Continued)

(52) U.S. Cl.
CPC .......... *B23K 9/0956* (2013.01); *B23K 9/0953* (2013.01); *B23K 9/125* (2013.01);
(Continued)

(58) Field of Classification Search
CPC . B23K 9/00; B23K 9/09; B23K 9/095; B23K 9/0953; B23K 9/0956
(Continued)

(56) References Cited

U.S. PATENT DOCUMENTS 3,867,769 A * 2/1975 Schow .................. G09B 19/24
434/234
5,811,055 A * 9/1998 Geiger ................. B23K 9/0061
266/48

(Continued)

FOREIGN PATENT DOCUMENTS

CA    2414891 A1    1/2002
CN    102744880     10/2012
(Continued)

OTHER PUBLICATIONS

Extended European Search Report from Corresponding Application No. 18168838.3; dated Oct. 1, 2018; pp. 1-8.
(Continued)

*Primary Examiner* — Dana Ross
*Assistant Examiner* — Ayub A Maye
(74) *Attorney, Agent, or Firm* — David J. Muzilla

(57) ABSTRACT

The invention described herein generally pertains to a system and method related to a semi-automatic or a manual welding operation and detecting a base material (e.g., workpiece) temperature, communicating the base material temperature, and adjusting the welding operation based on the detected base material temperature. A temperature sensor can detect temperature at a location that is a distance from the arc and, for instance, parallel to a direction of travel of the welding torch and such detected temperature can be communicated to the user performing the weld or the user controlling the semi-automatic welding system. The user can be informed if the detected temperature is within a tolerance or approved range or if the detected temperature is outside the tolerance or approved range for the type of base material and/or pre-defined temperature.

14 Claims, 9 Drawing Sheets

(51) Int. Cl.
  B23K 9/173 (2006.01)
  B23K 9/23 (2006.01)
  B23K 9/12 (2006.01)
  B23K 9/127 (2006.01)
(52) U.S. Cl.
  CPC .............. *B23K 9/127* (2013.01); *B23K 9/173* (2013.01); *B23K 9/23* (2013.01)
(58) Field of Classification Search
  USPC .......... 219/130.1, 136, 137.7, 137 R, 137 PS
  See application file for complete search history.

(56) References Cited

U.S. PATENT DOCUMENTS

| | | | |
|---|---|---|---|
| 6,710,298 | B2 | 3/2004 | Eriksson |
| 6,995,338 | B2 | 2/2006 | Hutchison |
| 8,657,179 | B1 | 2/2014 | Ding |
| 9,073,138 | B2 | 7/2015 | Wills |
| 9,266,182 | B2 | 2/2016 | Hung et al. |
| 9,415,459 | B2 * | 8/2016 | Bornemann ............ B23K 9/32 |
| 2001/0049837 | A1 | 12/2001 | Slack |
| 2003/0011673 | A1 | 1/2003 | Eriksson |
| 2004/0131498 | A1 | 7/2004 | Kuutti |
| 2005/0252898 | A1 | 11/2005 | Blechinger et al. |
| 2006/0010551 | A1 | 1/2006 | Bishop |
| 2008/0082179 | A1 | 4/2008 | Yang |
| 2010/0088793 | A1 | 4/2010 | Ghisleni |
| 2010/0288734 | A1 | 11/2010 | Dave et al. |
| 2012/0291172 | A1 | 11/2012 | Wills |
| 2013/0264322 | A1 | 10/2013 | Bornemann et al. |
| 2013/0291271 | A1 | 11/2013 | Becker et al. |
| 2014/0124491 | A1 | 5/2014 | Daniel et al. |
| 2014/0210987 | A1 | 7/2014 | Adkins |
| 2014/0332514 | A1 * | 11/2014 | Holverson ........... B23K 9/0953 219/130.01 |
| 2014/0374396 | A1 | 12/2014 | Luo et al. |
| 2015/0266128 | A1 | 9/2015 | Wills |
| 2016/0171906 | A1 | 6/2016 | Matthews |
| 2016/0207135 | A1 | 7/2016 | Beeson |
| 2016/0267806 | A1 | 9/2016 | Hsu |
| 2017/0227766 | A1 * | 8/2017 | Patel ......................... A61F 9/06 |

FOREIGN PATENT DOCUMENTS

| | | |
|---|---|---|
| CN | 104353925 | 2/2015 |
| CN | 104475897 | 4/2015 |
| EP | 2027962 | 8/2008 |
| EP | 2 022 592 A1 | 2/2009 |
| EP | 2022592 | 2/2009 |
| EP | 2 292 363 A1 | 3/2011 |
| EP | 2829384 | 1/2015 |
| JP | 2007-237213 A | 9/2007 |
| JP | 5573464 | 2/2012 |
| JP | 5490044 | 10/2012 |
| JP | 5916308 | 2/2013 |
| JP | 2014108456 | 6/2014 |
| KR | 101 219 182 B1 | 1/2013 |
| KR | 101314553 B1 | 10/2013 |
| WO | 2013184220 A2 | 8/2014 |
| WO | 2015127896 A1 | 9/2015 |
| WO | 2015199739 | 12/2015 |
| WO | 2016144741 A1 | 9/2016 |

OTHER PUBLICATIONS

"HEROS—titan Firefighting helmets" by Rosenbauer International AG (www.rosenbauer.com/en/int/rosenbauer-world/products/equipment/firefighting-helmets/heros-titan.html) Accessed Feb. 20, 2017—5 pages.

"Non-contact Temperature Measurement of Stainless Steel in a TIG Welding Process" by William Nichols Pollard, Jr. (vtechworks.lib.vt.edu/bitstream/handle/10919/35433/Pollard_WN_T_2009.pdf?sequence=1&isAllowed=y) Oct. 9, 2009—191 pages.

"Bringing Up to Date Applications of Infrared Thermography is Surveillance, Safety and Rescue" by Andres E. Rozlosnik (proceedings.spiedigitallibrary.org/proceeding.aspx?articleid=901986) Mar. 30, 2000 (Procedings of SPIE vol. 4020, Thermosense XXII, pp. 387-405)—19 pages.

"ONEW—360 Welding Training Simulator" by Wuhan ONEW Technology Co., Ltd. (en.onewtech.com/_d276479751.html) Jul. 10, 2015—12 pages.

"Novel noncontact temperature fiber sensor for multi-spot field measurements" by M. Jurca and C. Urs (ieeexplore.ieee.org/document/5687327/) 2010—4 pages.

"A real-time welding training system base on virtual reality" by Benkai Xie et al. (ieeexplore.ieee.org/abstract/document/7223419/) (IEEE Virtual Reality Conference Mar. 23-27, 2015) Mar. 2015—2 pages.

"Scott sight mask gives firefighters hands-free thermal vision" by David Szondy (newatlas.com/scott-sight-firefighting-thermal-imaging-mask/42947/) Apr. 22, 2016—5 pages.

"Halo Thermal Imaging products" by Halo Thermal Imaging (www.halothermalimaging.co.uk/products/) Accessed on Feb. 20, 2017—4 pages.

"Halo Thermal Imaging soloTI Product Sheet" by Halo Thermal Imaging (www.halothermalimaging.co.uk/assets/ProductDatasheets/Halo-datasheet-soloTI.pdf) Accessed on Feb. 20, 2017—2 pages.

"Halo Thermal Imaging solo Product Sheet" by Halo Thermal Imaging (www.halothermalimaging.co.uk/assets/ProductDatasheets/Halo-datasheet-solo.pdf) Accessed on Feb. 20, 2017—2 pages.

Extended European Search Report from Corresponding Application No. EP 17001193.6; dated Jan. 31, 2018.

* cited by examiner

METHOD AND SYSTEM FOR WELDING WITH TEMPERATURE DETECTOR

TECHNICAL FIELD

In general, the present invention relates to controlling a heat input for a weld or metal deposition process by monitoring a temperature of a workpiece at a location a distance from the arc and parallel to a direction of travel of a torch.

BACKGROUND OF THE INVENTION

Heat input into a weld is an important consideration. Often a maximum heat input level is determined and then the appropriate welding waveform and parameters are selected for the weld. However, it is difficult to change these parameters or the heat input during welding. Accordingly, an improved welding methodology and/or system addressing these concerns is needed.

SUMMARY OF THE INVENTION

In accordance with an embodiment of the present invention, a welding system is provided that includes a power supply configured to output a welding current to an electrode to create an arc between the electrode and a workpiece. The system can further include a welding torch for performing a welding operation on the workpiece to create a weld joint, the welding torch includes the electrode. The system further includes a temperature sensor configured to detect a temperature of the workpiece along a path relative to the weld joint or a travel path during the welding operation. The system can further include a controller configured to communicate an indication to a feedback device when the temperature of the workpiece exceeds a tolerance associated with a material of the workpiece.

In accordance with an embodiment of the present invention, a method is provided that includes at least the steps of: creating an arc between an electrode and a workpiece having a type of material; detecting a temperature of the workpiece at a location that is a distance from the arc, aligned with the arc, and parallel to a travel path of the electrode; communicating an indication to a feedback device when the detected temperature of the workpiece exceeds a tolerance for workpiece having the type of material; and adjusting a wire feed speed for wire delivery to the arc based on the detected temperature.

In accordance with an embodiment of the present invention, a welder system is provided that includes at least the following: a power supply configured to output a welding current to an electrode to create an arc between the electrode and a workpiece; a welding torch for performing a welding operation on the workpiece to create a weld joint, the welding torch includes the electrode; means for detecting a temperature of the workpiece along a path adjacent to the weld joint during the welding operation; means for communicating an indication when the temperature of the workpiece exceeds a tolerance associated with a material of the workpiece; and means for providing the indication to an operator performing the welding operation.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
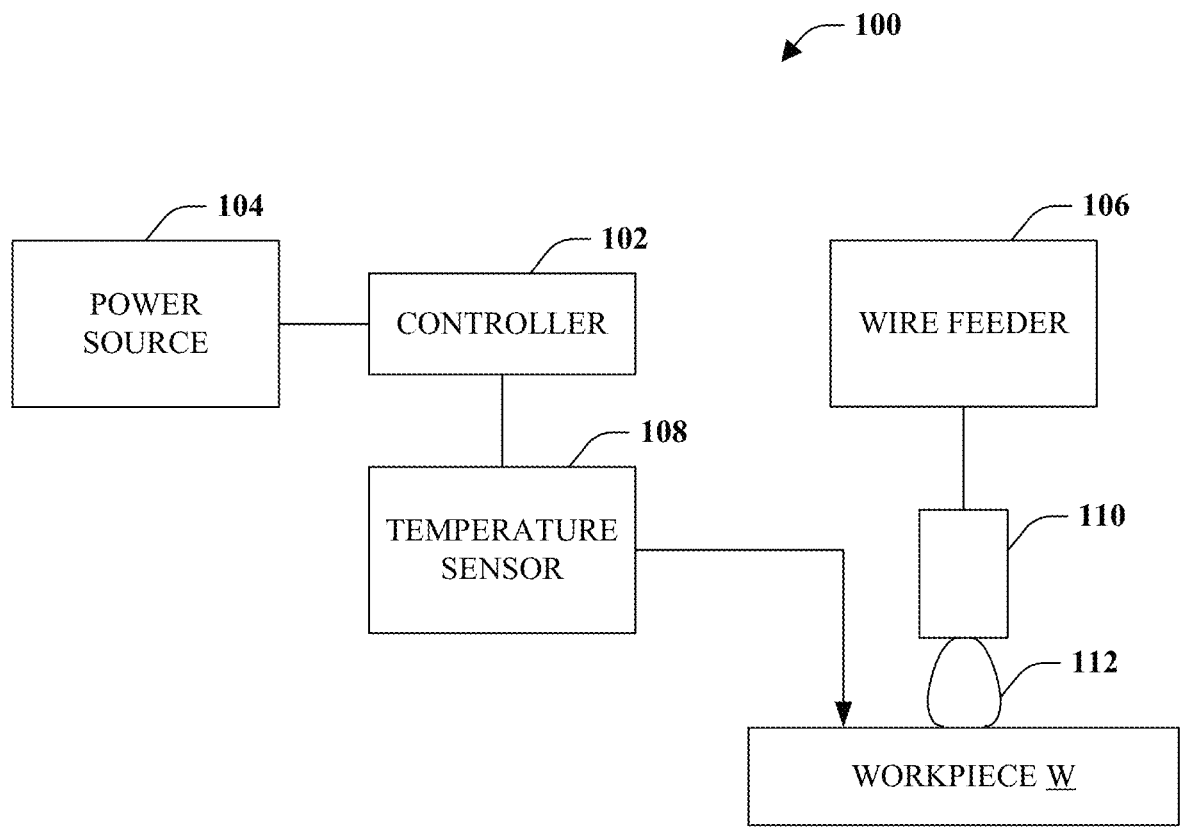
FIG. 1 illustrates an exemplary, non-limiting embodiment of a welding system that reduces inconsistencies in heat input based on a measured temperature of a workpiece at a distance adjacent to a travel path of the welding torch.

Embodiments of the invention relate to methods and systems that relate to semi-automatic or manual welding and detecting a base material (e.g., workpiece) temperature, communicating the base material temperature, and adjusting the welding operation based on the detected base material temperature. A temperature sensor can detect temperature at a location that is a distance from the arc and, for instance, parallel to a direction of travel of the welding torch and such detected temperature can be communicated to the user performing the weld or the user controlling the semi-automatic welding system. The user can be informed if the detected temperature is within a tolerance or approved range or if the detected temperature is outside the tolerance or approved range for the type of base material and/or predefined temperature. Each base material or workpiece can have a corresponding temperature and distance from the center of the arc created that should be maintained for a quality weld. For instance, upon notification or indication of the detected temperature being outside a tolerance, the user can adjust a travel speed or a wire feed speed to compensate for the temperature of the base material cooling too quickly or too slowly. The detected temperature or the indication can be communicated to the user via a feedback device that provides communication such as, but not limited to, auditory, visual, adaptive, haptic, among others. The feedback device can be, but is not limited to, a helmet, gloves, an electronic device, a wearable electronic device, or an apron. In a particular embodiment of the subject innovation, the indication can be a green light for within tolerance and a red light for outside tolerance, and such light can be flashed in a peripheral vision of the user via the helmet or welding lens of a helmet.

"Welding" or "weld" as used herein including any other formatives of these words will refer to depositing of molten material through the operation of an electric arc including but not limited to submerged arc, GTAW, GMAW, MAG, MIG, TIG welding, any high energy heat source (e.g., a laser, an electron beam, among others), or any electric arc used with a welding system. Moreover, the welding operation can be on a workpiece that includes a coating such as, but not limited to, a galvanized coating.

"Component" as used herein can be a portion of hardware, a portion of software, or a combination thereof that can include or utilize at least a processor and a portion of memory, wherein the memory includes an instruction to execute.

"Tolerance" as used herein including any other formatives of the word will refer to an allowable amount of variation of a specified quantity for a value. In particular, a tolerance can be defined (e.g., dynamically, predefined, among others) for temperature for a given location for a type of workpiece for a type of welding operation. It is to be appreciated that the tolerance can be chosen with sound engineering judgment and/or by one of ordinary skill in the art without departing from the scope of the subject innovation.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit or scope of the above discussed inventions. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject invention.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-5 illustrates a welding system that is used with an automated or semi-automated welding system. Turning to FIG. 1, an exemplary, non-limiting embodiment of welding system 100 is illustrated that reduces inconsistencies in heat input based on a measured temperature of a workpiece at a distance adjacent to a travel path of the welding torch. System 100 includes welding torch 110 (also referred to as "torch") having an electrode in which power source 104 creates arc 112 between electrode and workpiece W to complete an electrical circuit to perform the welding operation. System 100 can include power source 104 that is configured to create arc 112 between an electrode and workpiece W and further include wire feeder 106 is configured to deliver welding wire to a puddle formed by the electrode. Controller 102 can be configured to manage wire feed speed (WFS) of wire feeder 106, power source 104 that creates arc 112 for the welding operation. It is to be appreciated that the system 100 can be used to perform a welding operation with a consumable electrode, a non-consumable electrode, a shielding gas, no shielding gas, or a combination thereof.

Heat input for a welding operation can be a critical factor for a weld created but also a workpiece W after a weld has been created on such workpiece W. For instance, some applications or industries require consistent heat input along a length of a weld in order to avoid inconsistencies in a weld created, on the workpiece W, and/or in a composition of the workpiece W. If heat input is not consistent, a defect can emerge by cooling too fast causing internal cracking for workpiece W, internal stress for workpiece W, and/or harden workpiece W. Further, defects may emerge for inconsistent heat input by cooling too slow causing increased pores in workpiece W. System 100 allows for increasing consistency in a weld as well as workpiece W after a weld has been created.

System 100 further includes temperature sensor 108 that is configured to detect a temperature at a location or a path that is adjacent to a travel path of the welding operation. By detecting or measuring a temperature at a location or a path adjacent to a travel path of the welding operation, system 100 can determine heat input for a weld created as well as for workpiece W. In particular, measuring a temperature at a location on the arc or at the arc is problematic due to the intense heat input as well as variables surrounding such location. Rather, system 100 measures temperature at a location that is a distance away from the arc in which such distance has a tolerance for a temperature dependent upon at least one of a type of material for workpiece W, a location of where the temperature is being measured, a type of welding operation being performed, a welding parameter, among others. Thus, by calculating tolerances for a temperature for a location on workpiece W having a type of material, temperature sensor 108 detects temperature at a location in which controller 102 generates an indication if the temperature detected exceeds a tolerance.

Temperature sensor 108 can measure a temperature of a workpiece W at a location on workpiece W. By way of example and not limitation, the location on workpiece W can be adjacent to at least one of arc 112, welding torch 110, electrode, a weld created, a travel path of electrode, a travel path of torch head 110, a pre-defined path for an anticipated weld to be created, or a combination thereof. As discussed in more detail below, temperature sensor 108 can be configured to identify a temperature of workpiece W during a welding operation. In an embodiment, temperature sensor 108 can be configured to identify a temperature of workpiece W at a time, wherein the time can be, but is not limited to being, before a welding operation, during a welding operation, after a welding operation, or a combination thereof.

It is to be appreciated that controller 102 can be configured to communicate an indication when a tolerance is exceeded for a temperature at a location, wherein the tolerance can be based on at least one of a time a temperature is obtained, a type of material of workpiece W, a type of welding operation, a type of electrode (e.g., consumable, non-consumable, composition of electrode, among others), a welding parameter, a distance from a location, a location on the workpiece, among others, or a combination thereof.

Temperature sensor 108 is configured to measure, detect, or identify a temperature of workpiece W. Temperature sensor 108 can be, but is not limited to being, an infrared temperature device, a thermography device, a thermal camera, a thermocouple, a thermistor, a resistance temperature detector (RTD), a remote sensor, a wireless sensor, a wireless device, a transmission and reception system with a temperature sensor, a pyrometer, a Langmuir probe, a thermometer, one or more devices that communicate temperature information or data for a location, among others. Moreover, although temperature sensor 108 is depicted as a stand-alone sensor, temperature sensor 108 or a portion of the temperature sensor 108 can be incorporated into at least one of controller 102, torch head 110, wire feeder 106, power source 104, workpiece W, electrode, or a combination thereof. For example, temperature sensor 108 can include a temperature sensor system in which the temperature sensor obtains temperature data, the temperature data is communicated to a component, wherein the component can be controller 102 or a component that communicates the temperature data to controller 102. It is to be appreciated that such communication of temperature data from temperature sensor 108 can be wired, wireless, or via one or more components (e.g., transmitter, receiver, among others).

Temperature sensor 108 can detect an actual temperature of workpiece W, wherein such detection can be at or on a location of the workpiece W. It is to be appreciated that system 100 can include one or more temperature sensors 108 which measure temperatures at one or more locations of workpiece W.

Controller 102 can be configured to communicate an indication when a temperature measured, detected, or obtained, exceeds a tolerance for the welding operation. As discussed above, the tolerance can be determined based on at least one of a time a temperature is obtained, a type of material of workpiece W, a type of welding operation, a type of electrode (e.g., consumable, non-consumable, composition of electrode, among others), a welding parameter, a distance from a location, a location on the workpiece, among others, or a combination thereof. The indication can be, but is not limited to being, audible, haptic feedback, visual, electronic communication (e.g., text message, electronic mail, displayed text, telephone communication, cellular communication, among others), or a combination thereof.

Additionally or alternatively, controller 102 can adjust a welding parameter based on the detected temperature exceeding a threshold. In a particular non-limiting example, the indication can be to an operator performing the welding operation to adjust a travel speed of the welding torch 110. For instance, for a tolerance that is exceeded due to a detected temperature above a maximum temperature for the welding operation, the indication can be to increase travel speed. In another instance, for a tolerance that is exceeded due to a detected temperature below a minimum temperature for the welding operation, the indication can be to decrease travel speed. In still another non-limiting example, controller 102 or operator performing the welding operation can adjust a wire feed speed via wire feeder 106, wherein the adjustment is based on the communicated indication. For instance, for a tolerance that is exceeded due to a detected temperature above a maximum temperature for the welding operation, the indication can be to decrease wire feed speed. In another instance, for a tolerance that is exceeded due to a detected temperature below a minimum temperature for the welding operation, the indication can be to increase wire feed speed.

By way of example, the welding parameter can be, a type of welding operation, a type of shielding gas, a material composition of workpiece W, a welding pattern, a type of electrode, a composition of electrode, a wire feed speed, a waveform used for the welding operation, a polarity of a welding wire, a type of flux, a number of electrodes used in the welding operation, an arc voltage, a travel speed of a tractor welder that performs the welding operation, a travel speed of a torch that performs the welding operation, an arc current level, a height of torch, a distance between workpiece W and torch or an end of the electrode, an oscillation width of electrode, a temperature of welding wire, a temperature of electrode, a type of material of workpiece W, a frequency of oscillation of electrode, a polarity of the arc current, a polarity of the current for welding wire, a parameter that affects an arc current of the welding operation, a gauge of wire, a material of wire, an oscillation dwell, a left oscillation dwell, a right oscillation dwell, one or more temperatures of workpiece W at one or more locations on workpiece W, a temperature of workpiece W, any and all variation of advanced process controls (e.g., move controls, pulse-frequency, ramp rates, background level ratios, etc.), and the like.

Figure 2:
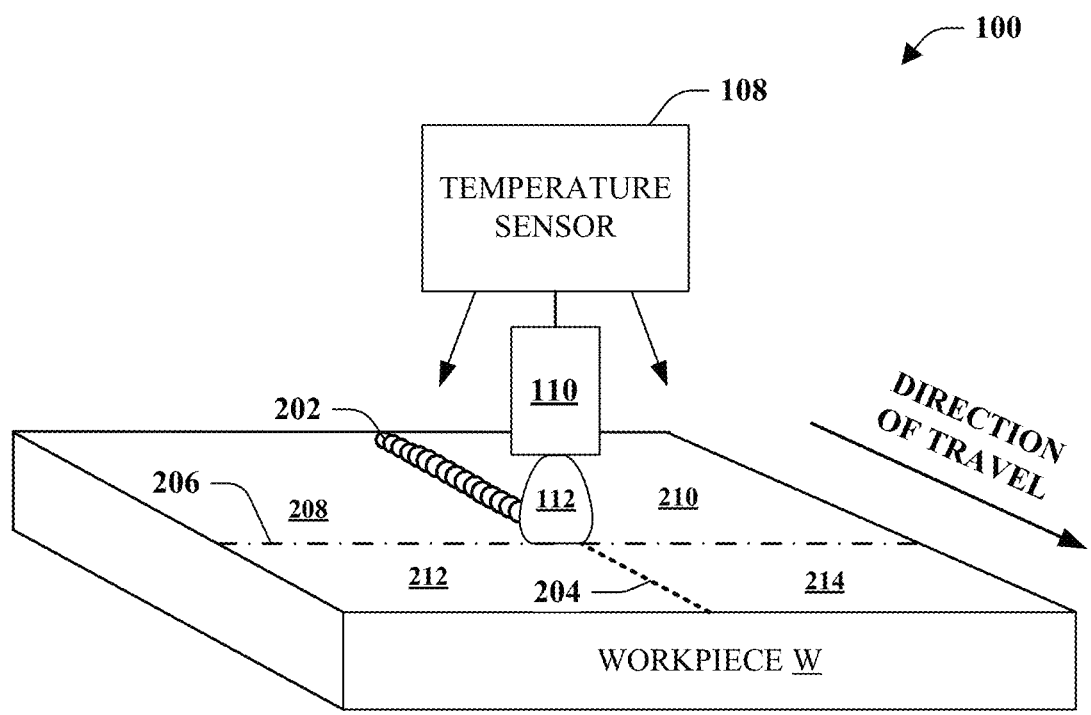
FIG. 2 illustrates an exemplary, non-limiting embodiment of a welding system that can detect a temperature at a location on the workpiece to reduce heat input inconsistencies during a welding operation.
Figure 3:
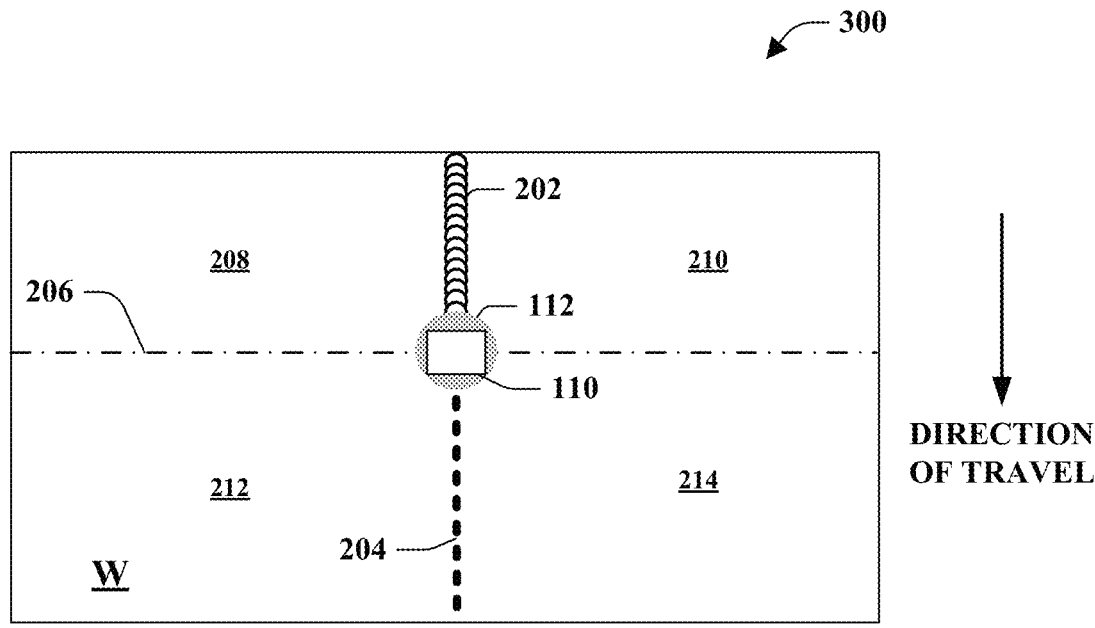
FIG. 3 is a top view of the welding system illustrated in FIG. 2.

FIG. 2 illustrates an exemplary, non-limiting embodiment of welding system 200 that detects a temperature at a location on the workpiece to reduce heat input inconsistencies during a welding operation. FIG. 3 illustrates a top view of FIG. 2, yet FIG. 3 does not illustrate temperature sensor 108 so as to not obstruct the top view. Welding system 200 illustrates a portion of system 100 for the sake of brevity, yet it is to be appreciated controller 102, power source 104, and/or wire feeder 106 are utilized to create arc 112 between an electrode and workpiece W. Welding system 200 creates arc 112 to create weld 202 on workpiece W in which a travel direction indicates travel path 204, wherein travel path 204 is where a weld is to be created. Travel path 204 can be a reference to identify a first side and a second side of the workpiece in which the first side is area that includes at least location 208 and location 212 and the second side (opposite the first side) is area that includes location 210 and location 214.

Temperature sensor 108 can be configured to detect temperature at a location on workpiece W, wherein controller 102 (shown in at least FIG. 1) communicates an indication if such detected temperature exceeds a tolerance. By way of example and not limitation, temperature sensor 108 is affixed or coupled to torch head 110. Yet, it is to be appreciated that, temperature sensor 108 can be affixed or coupled to at least one of a workpiece W, a support structure or device coupled to workpiece W or a portion of a welding system, a welding equipment, among others.

Temperature sensor 108 can detect temperature at a location on workpiece W, and in particular on a surface of workpiece W in a location that is on at least one of the first side, the second side, or a combination thereof. For instance, the temperature can be detected at a distance away or from at least one of arc 112, torch head 110, weld 202, travel path 204, or a combination thereof. By way of example, and not limitation, the temperature can be detected by temperature sensor 108 at one or more of a point in location 208, a point in location 212, a point in location 210, a point in location 214, a point along travel point 204, a point along weld 202, a point along reference numeral 206, a point below a surface weld 202 is created, an underside of workpiece W, an edge of workpiece W, among others.

By way of example, the temperature can be detected at a location that is aligned with at least one of arc 112, torch head 110, or electrode as indicated by reference numeral 206. In another example, the temperature can be detected at a location that is a distance from at least one of arc 112, torch head 110, or electrode and aligned with at least one of the arc 112, torch head 110, or electrode as indicated by reference numeral 206. This allows temperature sensor 108 to detect temperature at a location that is a distance from arc 112 and aligned with reference numeral 206 which is along a path that is parallel to travel path 204 and/or direction of travel for welding system 200.

In another example, the temperature can be detected at location 208 (on the first side) or location 210 (on the second side) that is a distance from at least one of arc 112, torch head 110, or electrode and behind (e.g., lagging) the reference numeral 206. In another example, the temperature can be detected at location 212 (on the first side) or location 214 (on the second side) that is a distance from at least one of arc 112, torch head 110, or electrode and in front (e.g., leading) the reference numeral 206.

In still another example, the temperature can be detected at a location that is located on at least one of weld 202 or travel path 204. In such example, controller 102 can communicate an indication when the temperature exceeds a tolerance for such welding operation and/or type of material of workpiece W.

In another embodiment, system 200 can utilize two or more tolerances corresponding to two or more distances for a welding operation to glean heat input for a welding operation and to adjust the welding operation via controller 102 or a notification or indication to an operator in real time. Temperature sensor 108 can be configured to detect a first temperature a first distance from arc 112 in line with or along either weld 202 or travel path and a second temperature a second distance from arc 112 in line with or along reference numeral 206. Controller 102 can communicate an indication when 1) the detected first temperature exceeds a first tolerance for the first distance of the welding operation; and 2) the detected second temperature exceeds a second tolerance for the second distance of the welding operation. Such indication can be to an operator to adjust a travel speed for welding torch 110 or a wire feed speed. In another embodiment, controller 102 can adjust the travel speed or the wire feed speed based on the one or more exceeded tolerances for the detected temperatures.

In another embodiment, temperature sensor 108 can be configured to detect temperature a depth below the surface of workpiece W. It is to be appreciated that system 200 can detect temperature on any surface of workpiece W or inside workpiece W. Moreover, a tolerance for each depth or location in or on workpiece W can be used for temperature to determine whether controller 102 communicates an indication.

Temperature sensor 108 can detect one or more temperatures at one or more locations, wherein each of the one or more locations can have a respective temperature tolerance which defines at least one of a maximum temperature, a minimum temperature, a range of temperatures, among others. The respective temperature tolerance can be specific to a distance or a location on or within workpiece W. In still another example, the temperature tolerance can be particular to a type of welding operation and/or a type of material of workpiece W. By way of example and not limitation, below is a table that illustrates tolerances in accordance with the subject innovation. It is to be appreciated that the below table is not exclusive and is solely an example since tolerances in accordance with the subject innovation can be determined for various parameters as discussed above.

In another embodiment, system 200 can utilize multiple temperature sensors (e.g., more than one temperature sensor 108). In still another embodiment, system 200 can include multiple metal deposition sources that deposit material onto a workpiece. In such example of having multiple metal depositions sources, such metal depositions sources can work in series. For example, a system can include two (2) metal deposition sources, wherein a first metal deposition source can deposit material first, and upon completion or during the same time, a second metal deposition source can deposit material after.

Figure 9:
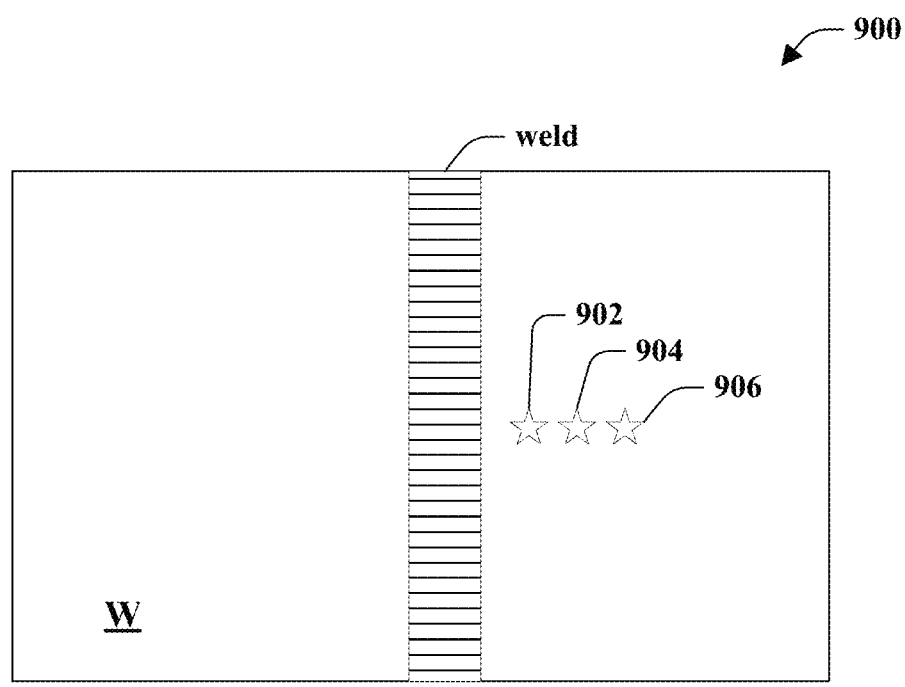
FIG. 9 illustrates a workpiece in accordance with the subject innovation.
Figure 10:
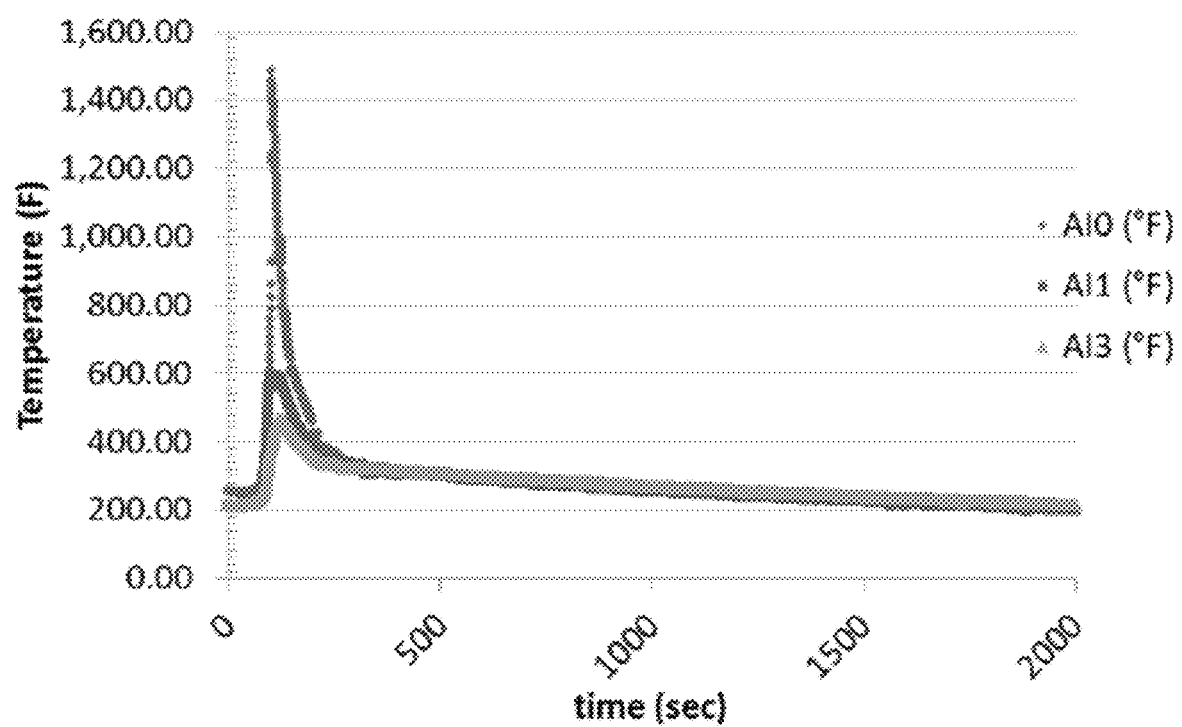
FIG. 10 illustrates a graph in accordance with the subject innovation.

Turning to FIGS. 9-14, various embodiments of the subject innovation are discussed. FIG. 9 illustrates a top view of workpiece W having metal deposited (e.g., a weld) in which workpiece W has first temperature sensor (AI1) 902, second temperature sensor (AI2) 904, and third temperature sensor (AI3) 906. FIG. 10 illustrates a graph of temperature and time for each temperature sensor. Below is Table 1 which illustrates more details for each:

TABLE 1

| Distance from Weld (mm) | 13. | 23. | 33. |
|---|---|---|---|
| Distance from Weld (in) | 0.53 | 0.94 | 1.3 |
| Thermo Couple | AI1 (F.) | AI2 (F.) | AI3 (F.) |
| Max Temp (F.) | 1482 | 594 | 459 |
| Max Temp (C.) | 805. | 312. | 237. |

The metal deposition process for the above can be a 1 inch wide bead (e.g., add 0.5 in total distance from weld. In addition, the location of the temperature sensors (e.g., thermocouples) can be approximately six (6) inches to nine (9) inches from end plate dimensions ¾ inches thick, 16 inches long, and 17 inches wide. In particular, the location can be 7.5 inches from the end plate.

Below is Table 2 which shows information related to the predictive assessments. It is noted that the modeling of weld pools based on welding process parameters may have deviations from actual measurements.

TABLE 2

| Voltage | 22 | 15.7 | 19.4 | 16.1 | 18.9 |
|---|---|---|---|---|---|
| Current | 117 | 146 | 212 | 107 | 113 |
| Power | 3507 | 2782 | 5415 | 2391 | 3017 |
| Approx. Heat Inpu (kj/in) | 4.2 | 4.8 | 6.5 | 2.9 | 3.6 |
| Bead Width (in) | 0.21 | 0.27 | 0.28 | 0.16 | 0.19 |
| Bead width (mm) | 5.3 | 6.8 | 7.1 | 4.1 | 4.7 |
| Bead width (mm) - predicted | 3.9 | 4.3 | 4.7 | 2.9 | 3.5 |

Figure 11:
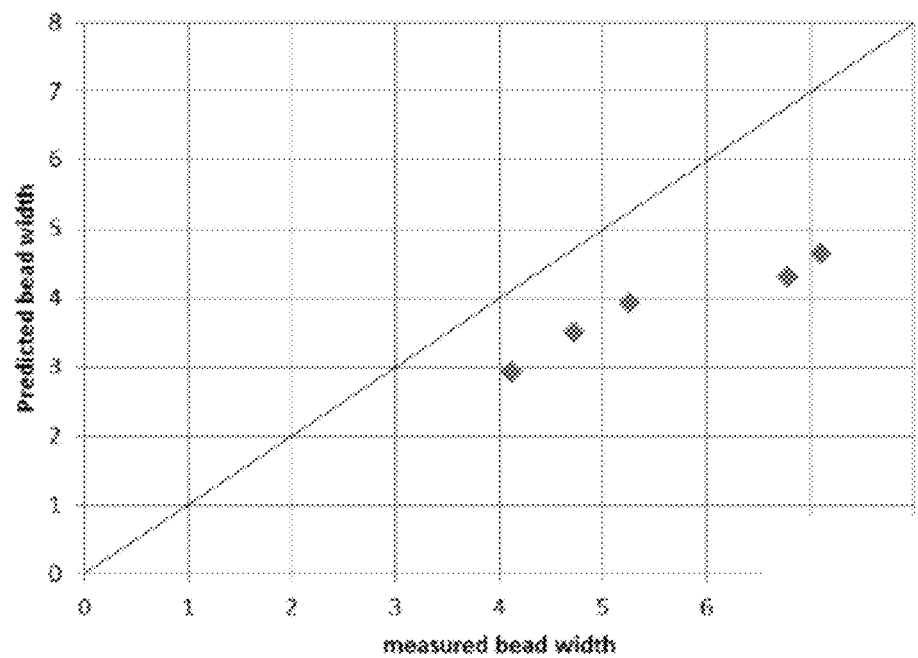
FIG. 11 illustrates a graph in accordance with the subject innovation.
Figure 12:
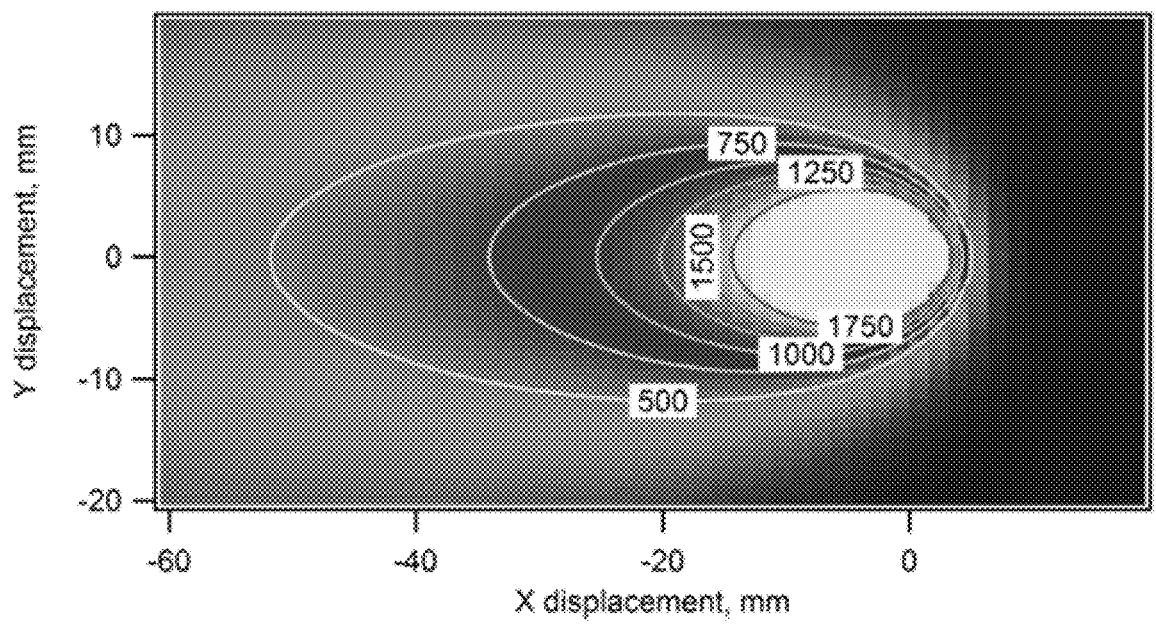
FIG. 12 illustrates a predicted heat contour in accordance with the subject innovation.

FIG. 11 illustrates a predicted bead width graph versus measured bead width. FIG. 12 illustrates directional displacement in the Y direction versus directional displacement in the X direction, wherein the predicted bead width was from models and taking the liquidus temperature to be around 1400 C.

Figure 13:
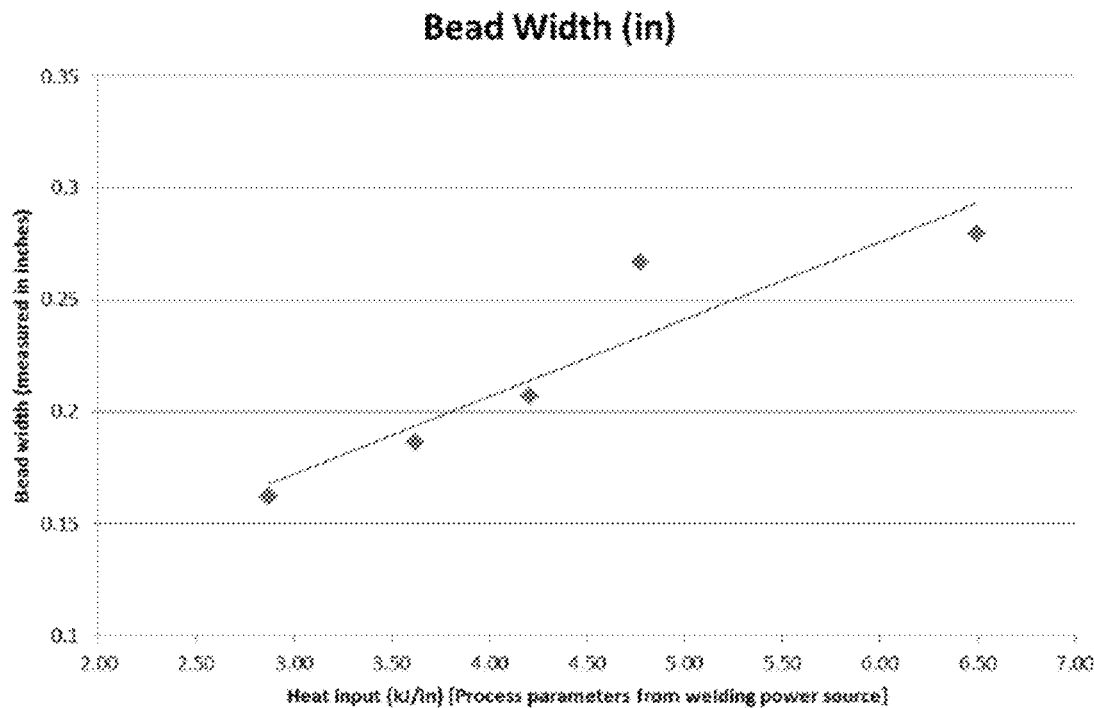
FIG. 13 illustrates a graph in accordance with the subject innovation.

Turning to FIG. 13, a heat input versus bead width graph is illustrated. The heat input based on process parameters can be calculated. The bead width can be based on heat input from look-up tables. This can be converted into temperature contours such as shown in FIG. 12. FIG. 12 illustrates a heat contour that can be a prediction based on modeling and not by measurement. FIG. 12 illustrates how the thermal profile can look but often is inaccurately modeled because of the need to be measured in real time (which the subject application provides). FIG. 12 can be used to provide metrics such as heat affected zone width. For example, the heat affected zone width can be used to generate a tolerance, wherein the tolerance can be based on fitting the actual temperature measured to a distance from the center of the bead of the weld and suggest a different travel speed or wire feed speed in order to achieve the appropriate heat affected zone width.

Figure 14:
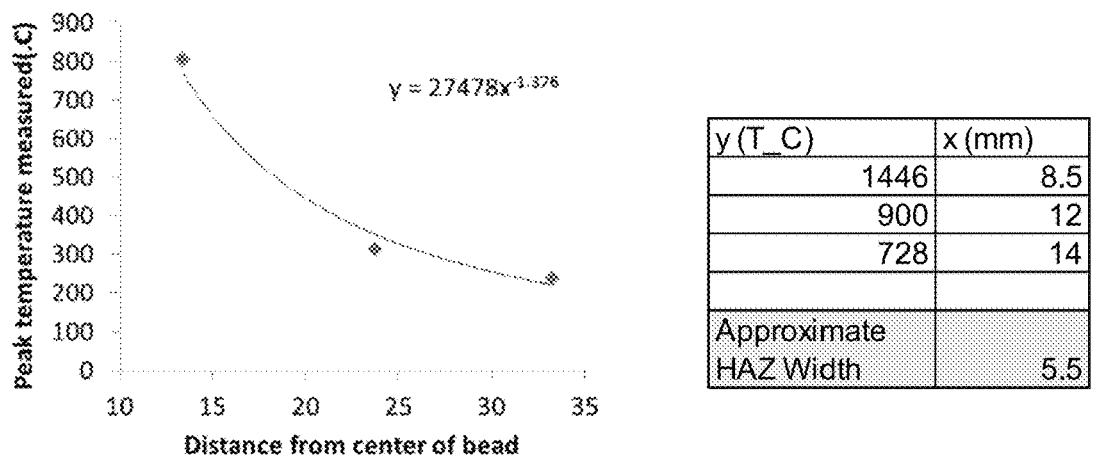
FIG. 14 illustrates a graph and chart in accordance with the subject innovation.

Turning to FIG. 14, heat affected zone width information is illustrated. The heat input can be calculated based on process parameters. The bead width can be determined based on heat input from a look-up table or pre-defined by a user or stored on a memory. This information can be converted into a temperature contour as shown in FIG. 12 and metrics such as heat affected zone width can be determined. The subject innovation can allow a determination of an accurate estimate of heat affected zone (HAZ) width from actual temperature measurements and fitting the actual temperature measurements to a distance from the center of the bead. The "tolerance" could be based on this fit to the predicted heat countour and suggest a different travel speed or wire feed speed in order to achieve the appropriate HAZ width.

It is to be appreciated that each type of welding operation and/or each type of material of workpiece W can include a temperature contour, wherein the temperature contour can include temperatures for distances from arc 112 and/or locations on or within workpiece W. For each location or distance, a tolerance can be defined. The definition of each temperature contour can be at least one of pre-defined, dynamically created based on user input or computer monitoring, downloaded or communicated from a cloud computing service, pre-defined and later updated based on welding operations performed, or a combination thereof. The temperature contour can further include information such as, but not limited to, temperatures or tolerances based on at least one of a distance from arc 112 and/or locations on or within workpiece W, maximum temperature for a location on or within workpiece W, minimum temperature for a location on or within workpiece W, range of temperatures allowed for a location on or within workpiece W, temperature or tolerance for a location based on a welding operation, temperature or tolerance for a location based on a type of material of workpiece W, temperature or tolerance for a type of electrode, temperature or tolerance for a welding operation, among others.

Controller 102 can be configured to identify an average temperature of workpiece W based on receiving two or more temperature readings for one or more locations on or within workpiece W. Controller 102 can further communicate an indication when the average temperature of workpiece W exceeds a tolerance for the average temperature of such welding operation, and in particular, such workpiece. In a particular example, temperature sensor can detect a first temperature on a first location on the first side and detect a second temperature on a second location on the second side, wherein the first location on the first side is mirrored to the second location on the second side. In such particular example, controller can evaluate the average temperature of both the first temperature and the second temperature to a tolerance for the first location and/or the second location.

In another particular example, temperature sensor can detect a first temperature on a first location on the first side and detect a second temperature on a second location on the second side, wherein the first location on the first side is not mirrored to the second location on the second side. In such particular example, controller can evaluate the first temperature and/or the second temperature to a tolerance respective to each first location and/or the second location.

In still another embodiment, temperature sensor 108 can capture a baseline temperature of workpiece W to compare such baseline temperature to a temperature captured during the welding operation or after the welding operation. Such comparison can be used in evaluating the weld created and/or workpiece W and whether the weld created and/or workpiece W are suitable for a particular application or industry. In particular, controller 102 can be configured to evaluate a number of exceeded tolerances during a welding operation and generate a score which can be used to evaluate whether the weld created or workpiece W of the welding operation is suitable.

Figure 4:
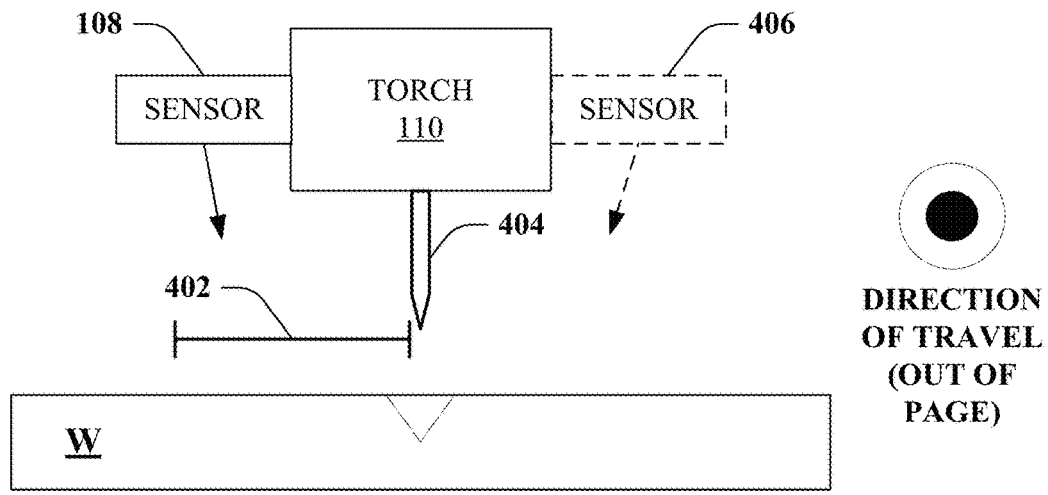
FIG. 4 illustrates an exemplary, non-limiting embodiment of a welding torch that includes a temperature sensor to detect temperature at a location that is a distance from an arc created between an electrode and a workpiece.

FIG. 4 illustrates an exemplary, non-limiting embodiment of welding torch 110 that includes temperature sensor 108 to detect temperature at a location that is a distance from an arc created between an electrode and workpiece W. Torch 110 is illustrated in a travel direction coming out of the page of FIG. 4. Temperature sensor 108 (referred to in FIG. 4 as "sensor 108") can be removeably attached or incorporated into torch 110. In a particular embodiment, sensor 108 can be affixed to a first side of torch 110 corresponding to a side of workpiece W. Sensor 108 can detect temperature at a location that is distance 402 away from at least one of electrode 404 or welding torch 110 (also referred to as "torch 110").

In another embodiment, sensor 108 can be removeably attached or incorporated into torch 110. In this particular embodiment, sensor 108 can be affixed to a first side of torch 110 corresponding to a side of workpiece W and additional sensor 406 can be affixed to a second side of torch 110 corresponding to a second side of workpiece W, wherein the first side of torch 110 is opposite the second side of torch 110 and the first side is opposite the second side. Sensor 108 and additional sensor 406 can detect temperatures at two or more locations that each have a respective distance away from at least one of electrode 404 or welding torch 110.

Figure 5:
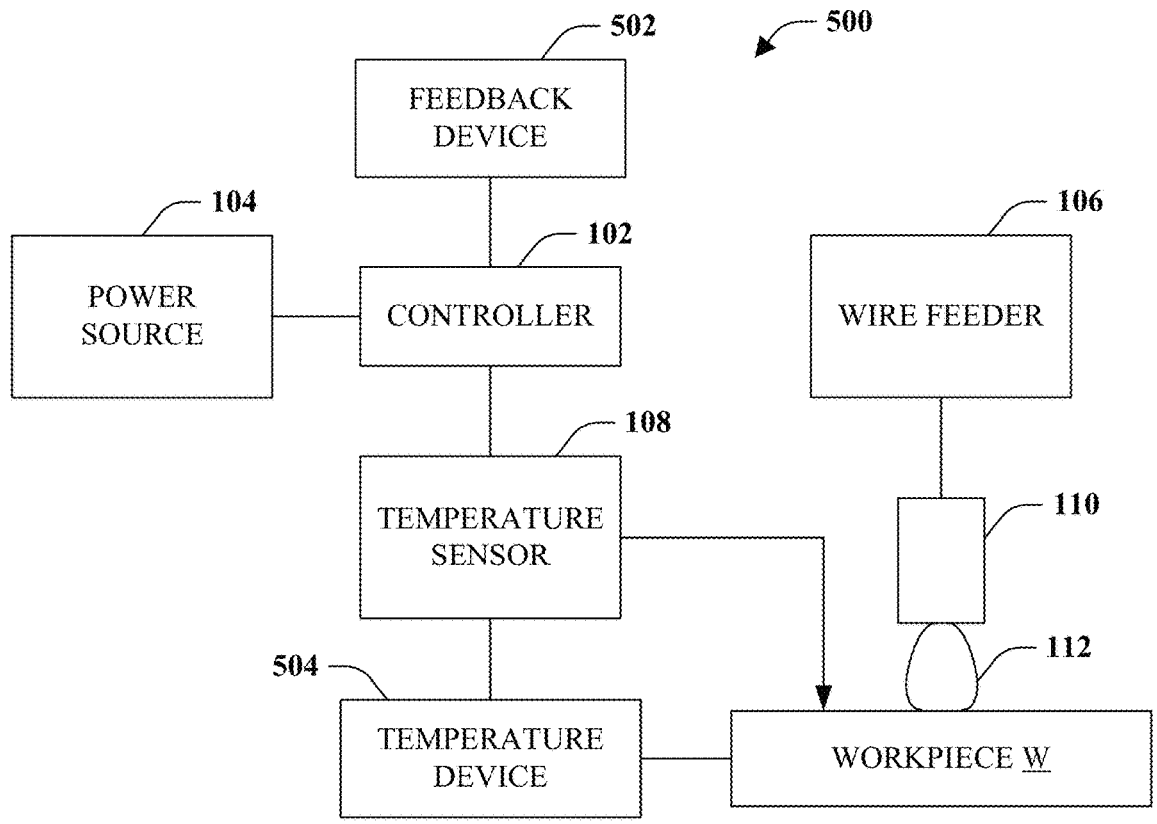
FIG. 5 illustrates an exemplary, non-limiting embodiment of a welding system that communicates an indication to a feedback device based on a measured temperature of a workpiece at a distance adjacent to a travel path of the welding torch.

FIG. 5 illustrates an exemplary, non-limiting embodiment of welding system 500 that communicates an indication to feedback device 502 based on a measured temperature of workpiece W at a distance adjacent to a travel path of welding torch 110. System 500 includes welding torch 110 having an electrode in which power source 104 creates arc 112 between electrode and workpiece W to complete an electrical circuit to perform the welding operation. System 500 can include power source 104 that is configured to create arc 112 between an electrode and workpiece W and further include wire feeder 106 is configured to deliver welding wire to a puddle formed by the electrode. Controller 102 can be configured to manage wire feed speed (WFS) of wire feeder 106, power source 104 that creates arc 112 for the welding operation. It is to be appreciated that the system 500 can be used to perform a welding operation with a consumable electrode, a non-consumable electrode, a shielding gas, no shielding gas, or a combination thereof. Controller 102 is further configured to communicate an indication when a temperature detected by temperature sensor 108 exceeds or does not meet a tolerance. The indication can be communicated to an operator performing the welding operation in which the indication provides instruction to adjust wire feed speed and/or travel speed. In another embodiment, controller 102 adjusts the wire feed speed in addition to an operator being notified to adjust travel speed in response to the temperature exceeding or not meeting a tolerance. In still another embodiment, controller can adjust the travel speed and/or the wire feed speed in response to the detected temperature not meeting or exceeding a tolerance.

Controller 102 can communicate the indication to feedback device 502. Feedback device 502 can deliver the indication, wherein the indication can be, but is not limited to being auditory, visual, adaptive, haptic, among others. Feedback device 502 can be, but is not limited to, a speaker, a computer, a display, a cell phone, a tablet, a computing device, a siren, a light, an LED, a helmet, gloves, an electronic device, a wearable electronic device, or an apron. In a particular embodiment of the subject innovation, the indication can be a green light for within tolerance and a red light for outside tolerance, and such light can be flashed in a peripheral vision of the user via the helmet or welding lens of a helmet. In another embodiment, the feedback device 502 can be a heads-up-display (HUD) that provides an image and/or a sound to indicate the operator performing the welding operation should adjust at least one of a welding parameter, a wire feed speed, and/or a travel speed. In a particular example, a vibration can be used as an indication to an operator, wherein the vibration is provided by feedback device 502 being, such as, a welding torch, a glove, a wearable device, a welding helmet, a floor mat, a belt, an apron, among others. In still another example, the indication can be a light or LED, wherein feedback device 502 receives the indication from controller 102 and the light or LED can signal when a tolerance is met or exceeded. For example, colors for the light or LED can be designated to a particular indication (e.g., red for exceeding a tolerance, green for being within a tolerance). In another example, a HUD in a helmet can provide a graphic overlay with a heat map or infrared map of heat on the workpiece to illustrate heat input and/or tolerances being exceeded or not.

System 500 further includes temperature device 504 that is configured to deliver additional heat or cooling to workpiece W based at least on detected temperature at a location on or within workpiece W. The temperature device 504 can be a heating element to increase heat input to a portion of workpiece W or at an area of workpiece W or a cooling element to decrease heat input to a portion of workpiece W or at an area of workpiece W. For instance, temperature device 504 can be used to adjust heat input to workpiece W instead of adjusting wire feed speed or travel speed. In another instance, temperature device 504 can be used to adjust heat input to workpiece W in combination with adjusting wire feed speed and/or travel speed.

Figure 6:
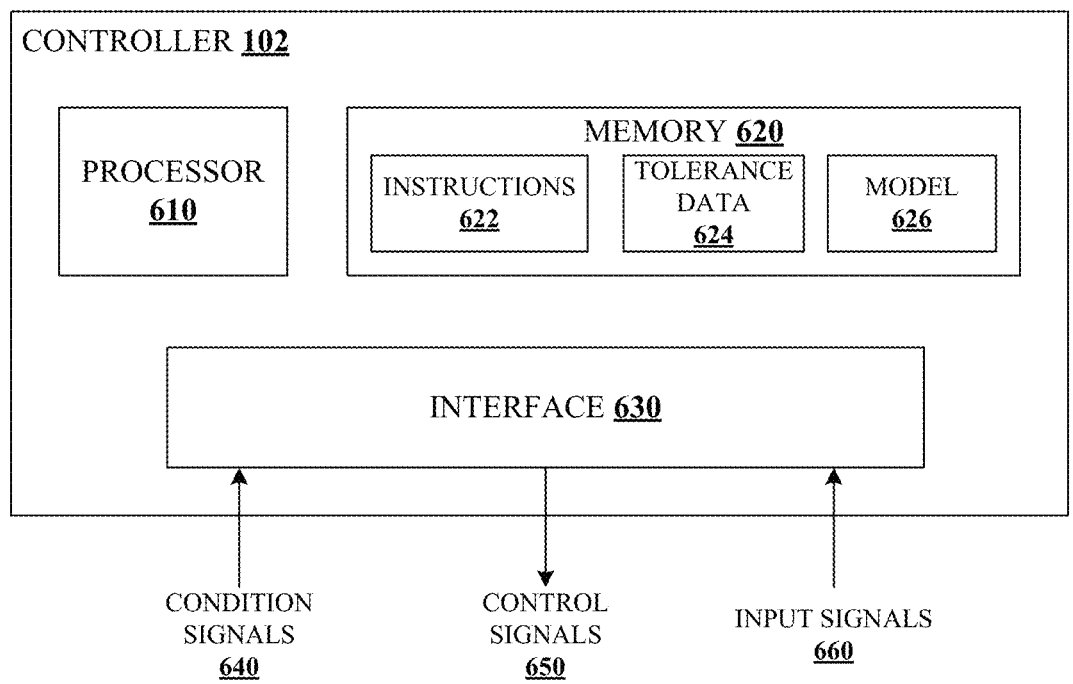
FIG. 6 illustrates an exemplary, non-limiting embodiment of a welding controller according to one or more aspects.

Referring to FIG. 6, illustrated a schematic block diagram of an exemplary, non-limiting embodiment of controller 102 according to one or more aspects. As shown in FIG. 6, controller 102 can be a microcontroller that includes a processor 610, a memory 620, and an interface 630. Processor 610 is configured to execute computer-executable instructions, such as instructions 622 stored by memory 620, for example. Instructions 622 comprise software executable by processor 610 to configure controller 102 to perform aspects described herein. Memory 620 can be non-transitory, computer-readable storage media including volatile storage media (e.g. a random access memory, a data cache, a register) and/or non-volatile storage media such as a hard drive, flash memory, portable media (e.g. floppy disk, USB drive, optical disc, etc.), a read-only memory, etc. For the purposes of this description, the various forms of computer-readable storage media described above are collectively shown and referred to as memory 620. Interface 630 can be a communications interface to enable controller 102 to communicate with other components such as welding power source 104, temperature sensor 108, etc. In one example, interface 630 can include general purpose input/output (I/O) pins, which can be coupled to various signal lines or circuit paths to transmit or receive signals. In another example, the interface 630 can be a connection to a data bus. In yet another example, interface 630 can be a wireless interface.

Controller 102, via interface 630, can receive condition signals 640 indicative of one or more conditions (e.g. environmental conditions, physical conditions, operational conditions, etc.) associated with the systems 100, 200, 300, 400, and/or 500. Tolerance data 624, stored by memory 620, can be generated based on condition signals 640. Processor 610 can employ model 626 with tolerance data 624 to determine, for example, communications for a feedback based on a temperature of a workpiece, travel speed for a welding operation for a temperature detected by a temperature sensor, a wire feed speed for a welding operation for a temperature detected by a temperature sensor, among others. Based on these determined quantities or values, controller 102 can generate control signals 650 transmitted by interface 630. Control signals 650 can be transmitted to power source 104 to limit a welding output generated thereby, or to a user interface to inform an operator of input limits (e.g. welding output preset limits) and/or to normalize inputs in accordance with the limits. For instance, such limits can be, but are not limited to, a travel speed, a wire feed speed, a welding parameter, among others. Moreover, interface 630 can receive input signals 660 (temperature readings, travel speed readings, wire feed speed, for example), which can be utilized to generate or supplement tolerance data 624, or establish settings (e.g. output presets) by which controller 102 implements via control signal 650.

Model 626 can be a set of mathematical relationships correlating various conditions to temperature of the workpiece at a location that is a distance from the arc, temperature of a workpiece being a particular type of material, a distance from the arc for a workpiece, etc. as described above. Accordingly, processor 610 can utilize the set of mathematical relationships with tolerance data 624 to calculate deliverable power, travel speed, wire feed speed, or a welding parameter. In another example, model 626 can be based on empirical data. For instance, for the respective conditions and, specifically respective levels or values for the conditions, results can be experimentally measured and collected. The results can be, for example, actual measurements of temperatures under varying conditions for various types of materials that can be a workpiece. The results can be tabulated and the tables, which can be form of model 626, utilized to determine or interpolate desired quantities based on tolerance data 624 gathered by controller 102. In another example, the empirical data is utilized to generate to train model 626 via artificial intelligence or machine learning techniques. For instance, model 626 can be a neural network or other classification scheme that is trained on the empirical data to develop relationships between temperature of the workpiece and travel speed and/or wire feed speed. The developed relationships can be utilized to determine welding parameters from new condition inputs in situ. According to this example, model 626 can include or involve, for instance, a neural network, a decision tree, an association rule, a support vector machine, a Bayesian network, genetic algorithms, or the like.

By way of example and not limitation, the welding parameter can be, but is not limited to, a type of welding operation, a type of shielding gas, a material composition of workpiece W, a welding pattern, a type of electrode, a composition of electrode, a wire feed speed, a waveform used for the welding operation, a polarity of a welding wire, a type of flux, a number of electrodes used in the welding operation, an arc voltage, a travel speed of a tractor welder that performs the welding operation, a travel speed of a torch that performs the welding operation, an arc current level, a height of torch, a distance between workpiece W and torch or an end of the electrode, an oscillation width of electrode, a temperature of welding wire, a temperature of electrode, a type of material of workpiece W, a frequency of oscillation of electrode, a polarity of the arc current, a polarity of the current for welding wire, a parameter that affects an arc current of the welding operation, a gauge of wire, a material of wire, an oscillation dwell, a left oscillation dwell, a right oscillation dwell, one or more temperatures of workpiece W at one or more locations on workpiece W, any and all variation of advanced process controls (e.g., move controls, pulse-frequency, ramp rates, background level ratios, etc.), and the like.

In an embodiment, the indication informs an operator to adjust a travel speed of the welding torch along the weld joint to bring the temperature of the workpiece into compliance. In an embodiment, the system can include a wire feeder configured to deliver a welding wire to the arc, wherein the controller is configured to adjust a wire feed speed of the wire feeder when the temperature of the workpiece exceeds the tolerance. In an embodiment, the controller is configured to calibrate the tolerance based at least one of the material of the workpiece, a distance from the arc, or a welding process.

In an embodiment, the system can include the temperature sensor is further configured to detect an additional temperature of the workpiece at an additional path and the controller is further configured to communicate the indication to a feedback device when an average temperature of the temperature and the additional temperature exceed the tolerance.

In an embodiment, the path is a location that is aligned with the welding torch and parallel to a travel path of the welding torch. In an embodiment, the path is a location that is in front of the welding torch, a distance from the electrode, and parallel to a travel path of the welding torch. In an embodiment, the path is a location that is behind the welding torch, a distance from the electrode, and parallel to a travel path of the welding torch.

In an embodiment, the system can include the temperature sensor is affixed to the welding torch and detects the temperature of the workpiece along the path adjacent to the weld joint during the welding operation with the path being on a first side of the workpiece and a distance from the arc. In the embodiment, the system can include an additional temperature sensor affixed to the welding torch configured to detect an additional temperature of the workpiece along an additional path adjacent to the weld joint during the welding operation with the additional path being on a second side of the workpiece and the distance from the arc, the first side is opposite the second side with a travel path of the welding torch therebetween.

In the embodiment, the controller further configured to communicate the indication to the feedback device when an average temperature of the workpiece exceeds the tolerance associated with the material of the workpiece, wherein the average temperature is of the temperature on the path on the first side and the additional temperature on the additional path on the second side.

In an embodiment, the indication is a visual indicator and the feedback device is a helmet. In an embodiment, the indication is a haptic feedback and the feedback device is at least one of a glove or a welding torch.

In an embodiment, the controller increases the wire feed speed of the wire feeder when the temperature of the workpiece is below a minimum temperature used to calculate the tolerance. In an embodiment, the controller decreases the wire feed speed of the wire feeder when the temperature of the workpiece is above a maximum temperature used to calculate the tolerance.

In an embodiment, the system can further include the temperature sensor detects the temperature of the workpiece along the path adjacent to the weld joint during the welding operation with the path being a first distance from the arc; the temperature sensor detects an additional temperature of the workpiece along an additional path adjacent to the weld joint during the welding operation with the additional path being on a second distance from the arc; and the controller further configured to communicate the indication to the feedback device when the temperature or the additional temperature of the workpiece exceeds the tolerance associated with the material of the workpiece for the first distance or the second distance.

Figure 7:
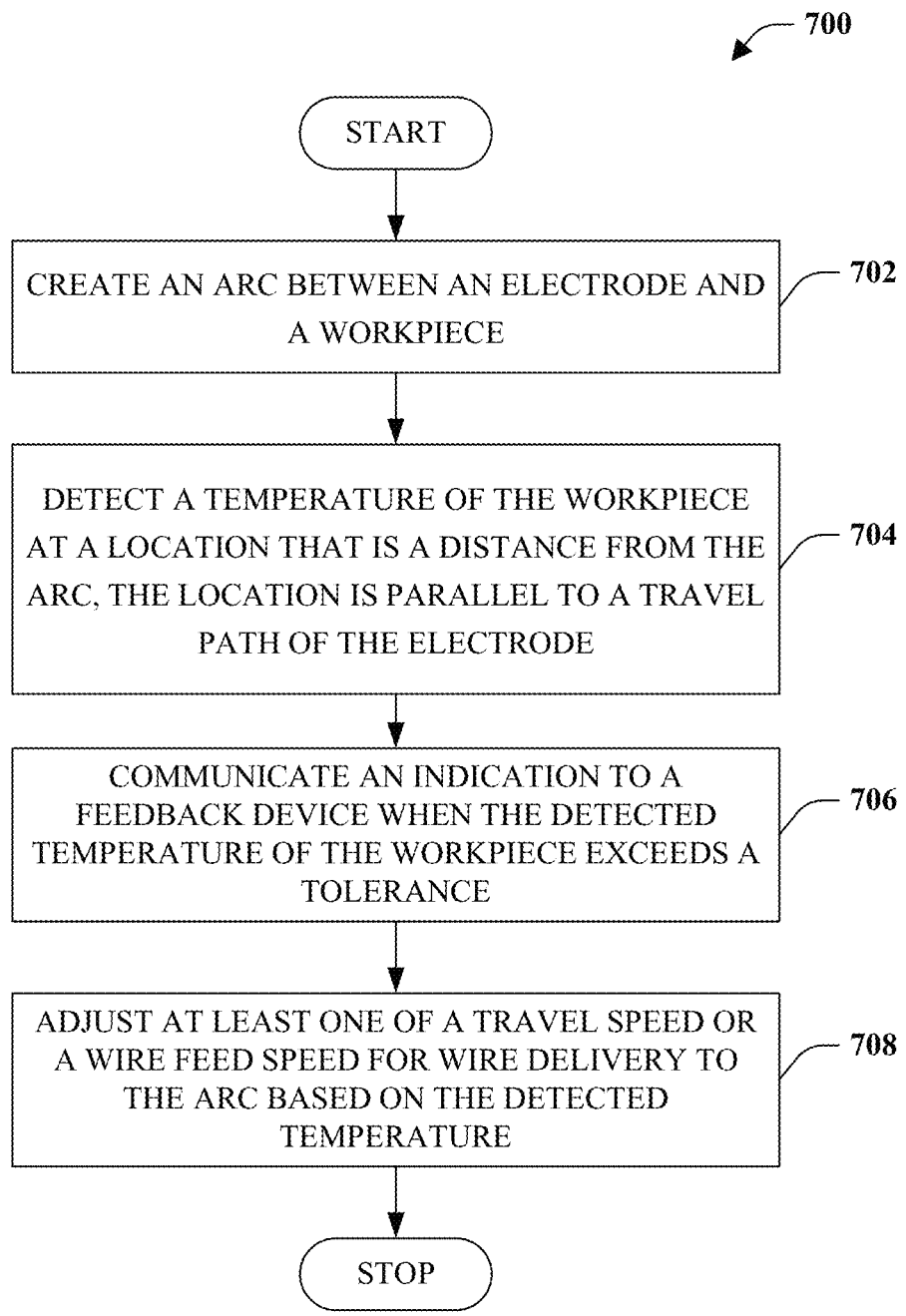
FIG. 7 is a flow diagram of detecting temperature of a workpiece to reduce inconsistency of heat input for a welding operation.
Figure 8:
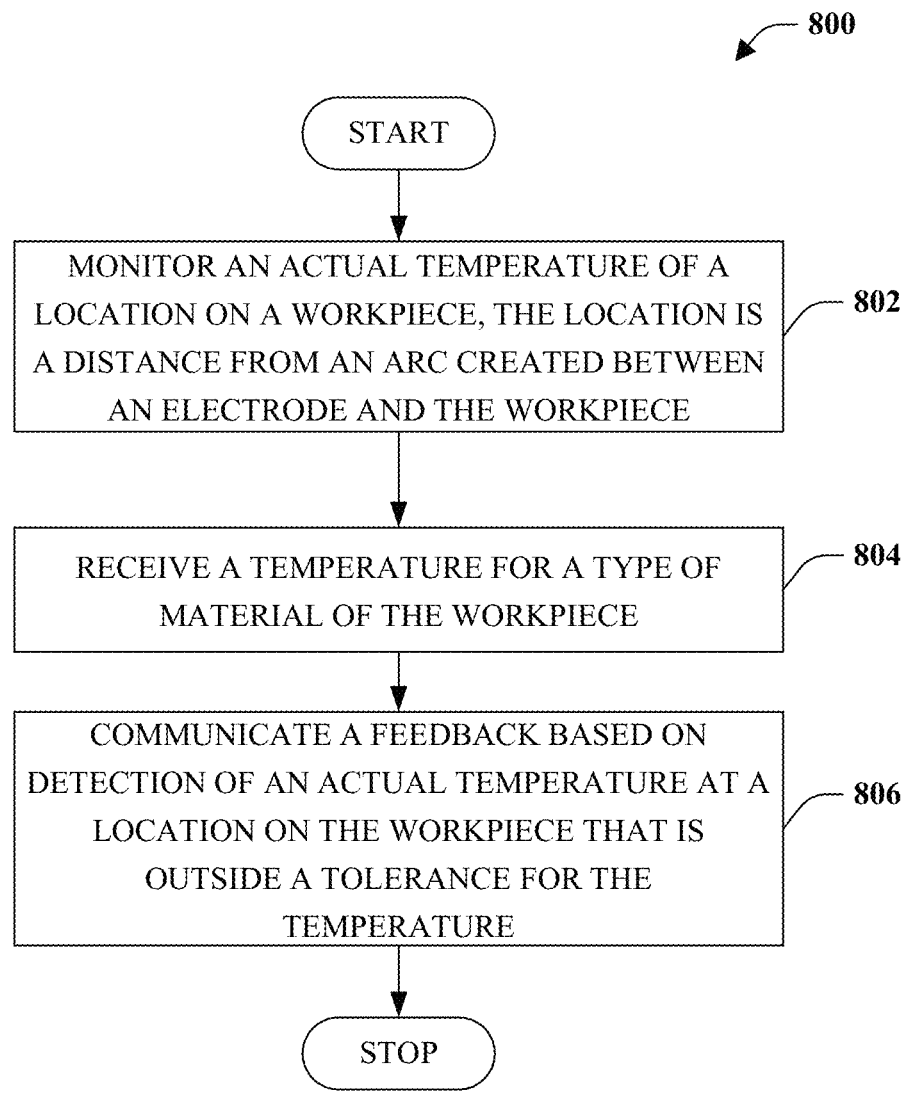
FIG. 8 is a flow diagram of communicating feedback based on a monitored temperature of a workpiece at a location that is a distance from the arc created on such workpiece.

In view of the exemplary devices and elements described supra, methodologies that may be implemented in accordance with the disclosed subject matter will be better appreciated with reference to the flow charts and/or methodology of FIGS. 7-8. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 700 of FIG. 7 which is a flow diagram 700 that detects temperature of a workpiece to reduce inconsistency of heat input for a welding operation. At reference block 702, an arc between an electrode and a workpiece can be created. At reference block 704, a temperature of the workpiece at a location that is a distance from the arc can be detected, wherein the location is parallel to a travel path of the electrode. In particular, the temperature is continuously being detected in real time along a path that can be adjacent to the travel path of the electrode. In a particular example, the temperature can be detected along a path (or paths for more than one temperature sensor) that is parallel to the travel path of the electrode on either side of the electrode. At reference block 706, an indication can be communicated to a feedback device when the detected temperature of the workpiece exceeds a tolerance. At reference block 708, at least one of a travel speed or a wire feed speed for wire delivery to the arc can be adjusted based on the detected temperature. In particular, at least one of the wire feed speed or the travel speed can be maintained, increased, or decreased based on the detected temperature being within the tolerance, above a maximum temperature used to calculate the tolerance, or below a minimum temperature used to calculate the tolerance.

FIG. 8 illustrates a flow diagram 800 that communicates feedback based on a monitored temperature of a workpiece at a location that is a distance from the arc created on such workpiece. At reference block 802, an actual temperature of a location on a workpiece can be monitored, wherein the location is a distance from an arc created between an electrode and the workpiece. At reference block 804, a temperature for a type of material of the workpiece can be received. At reference block 806, a feedback can be communicated based on detection of an actual temperature at a location on the workpiece that is outside a tolerance for the temperature. For example, a tolerance can be based on a distance from an arc for a particular type of material of a workpiece and such tolerance can be a range of temperatures (e.g., a minimum temperature to a high temperature). In another example, the tolerance can be a percentage of a target temperature for a particular type of material of a workpiece at a specific distance (e.g., a ±five percent of a target temperature).

In an embodiment, the indication informs an operator to adjust a travel speed of a welding torch to bring the temperature of the workpiece into compliance of the tolerance.

In an embodiment, the method can include detecting an additional temperature of the workpiece at an additional location that is an additional distance from the arc, aligned with the arc, and parallel to the travel path of the electrode and communicating the indication to the feedback device when the detected temperature or additional temperature of the workpiece exceeds the tolerance for the distance or the additional distance.

In an embodiment, the method can include calibrating the tolerance based at least one of the type of material of the workpiece, a distance from the arc, or a welding process.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit or scope of the above discussed inventions. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject invention.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:
1. A welding system, comprising:
a power supply configured to output a welding current to an electrode to create an arc between the electrode and a workpiece;
at least one welding torch for performing a welding operation on the workpiece to create a weld joint, the welding torch includes the electrode;
a temperature sensor configured to detect a temperature of the workpiece along a path adjacent to the weld joint during the welding operation; and
a controller configured to communicate an indication to a feedback device when the temperature of the workpiece exceeds a tolerance associated with a material of the workpiece during the welding operation, and wherein the controller is configured to calibrate the tolerance before the welding operation based on the material of the workpiece, a distance from the arc, and a welding process.

2. The welding system of claim 1, wherein the indication informs an operator to adjust a travel speed of the welding torch along the weld joint to bring the temperature of the workpiece into compliance.

3. The welding system of claim 1, further comprising a wire feeder configured to deliver a welding wire to the arc, wherein the controller is configured to adjust a wire feed speed of the wire feeder when the temperature of the workpiece exceeds the tolerance.

4. The welding system of claim 1, further comprising:
the temperature sensor is further configured to detect an additional temperature of the workpiece at an additional path; and
the controller is further configured to communicate the indication to a feedback device when an average temperature of the temperature and the additional temperature exceed the tolerance.

5. The welding system of claim 1, wherein the path is a location that is aligned with the welding torch and parallel to a travel path of the welding torch.

6. The welding system of claim 1, wherein the path is a location that is in front of the welding torch, a distance from the electrode, and parallel to a travel path of the welding torch.

7. The welding system of claim 1, wherein the path is a location that is behind the welding torch, a distance from the electrode, and parallel to a travel path of the welding torch.

8. The welding system of claim 1, further comprising:
the temperature sensor is affixed to the welding torch and detects the temperature of the workpiece along the path adjacent to the weld joint during the welding operation with the path being on a first side of the workpiece and the distance from the arc;
an additional temperature sensor affixed to the welding torch configured to detect an additional temperature of the workpiece along an additional path adjacent to the weld joint during the welding operation with the additional path being on a second side of the workpiece and the distance from the arc, the first side is opposite the second side with a travel path of the welding torch therebetween.

9. The welding system of claim 1, wherein the indication is a visual indicator and the feedback device is a helmet.

10. The welding system of claim 1, wherein the indication is a haptic feedback and the feedback device is at least one of a glove or a welding torch.

11. The welding system of claim 1, wherein the controller increases the wire feed speed of the wire feeder when the temperature of the workpiece is below a minimum temperature used to calculate the tolerance.

12. The welding system of claim 1, wherein the controller decreases the wire feed speed of the wire feeder when the temperature of the workpiece is above a maximum temperature used to calculate the tolerance.

13. The welding system of claim 1, further comprising:
the temperature sensor detects the temperature of the workpiece along the path adjacent to the weld joint during the welding operation with the path being a first distance from the arc;
the temperature sensor detects an additional temperature of the workpiece along an additional path adjacent to the weld joint during the welding operation with the additional path being a second distance from the arc; and
the controller further configured to communicate the indication to the feedback device when the temperature or the additional temperature of the workpiece exceeds the tolerance associated with the material of the workpiece for the first distance or the second distance.

14. The welding system of claim 8, further comprising the controller further configured to communicate the indication to the feedback device when an average temperature of the workpiece exceeds the tolerance associated with the material of the workpiece, wherein the average temperature is of the temperature on the path on the first side and the additional temperature on the additional path on the second side.

* * * * *